United States Patent
Yang et al.

(10) Patent No.: US 8,762,390 B2
(45) Date of Patent: Jun. 24, 2014

(54) QUERY SPECIFIC FUSION FOR IMAGE RETRIEVAL

(71) Applicant: NEC Laboratories America, Inc., Princeton, NJ (US)

(72) Inventors: Ming Yang, Sunnyvale, CA (US); Shaoting Zhang, Highland Park, NJ (US); Kai Yu, San Jose, CA (US)

(73) Assignee: NEC Laboratories America, Inc., Princeton, NJ (US)

( * ) Notice: Subject to any disclaimer, the term of this patent is extended or adjusted under 35 U.S.C. 154(b) by 0 days.

(21) Appl. No.: 13/679,317

(22) Filed: Nov. 16, 2012

(65) Prior Publication Data

US 2013/0132402 A1    May 23, 2013

Related U.S. Application Data

(60) Provisional application No. 61/561,996, filed on Nov. 21, 2011.

(51) Int. Cl.
*G06F 7/00* (2006.01)
*G06F 17/30* (2006.01)

(52) U.S. Cl.
USPC ..................................................... 707/748

(58) Field of Classification Search
None
See application file for complete search history.

(56) References Cited

U.S. PATENT DOCUMENTS

| | | | |
|---|---|---|---|
| 2004/0024720 A1* | 2/2004 | Fairweather | 706/46 |
| 2007/0009159 A1* | 1/2007 | Fan | 382/209 |
| 2007/0185946 A1* | 8/2007 | Basri et al. | 708/200 |
| 2007/0239694 A1* | 10/2007 | Singh et al. | 707/3 |
| 2008/0159622 A1* | 7/2008 | Agnihotri et al. | 382/157 |
| 2009/0003698 A1* | 1/2009 | Milward et al. | 382/171 |
| 2009/0015676 A1* | 1/2009 | Ke et al. | 348/169 |
| 2009/0137924 A1* | 5/2009 | Kapoor et al. | 600/545 |
| 2009/0185746 A1* | 7/2009 | Mian et al. | 382/209 |
| 2009/0313267 A1* | 12/2009 | Girgensohn et al. | 707/100 |
| 2010/0223276 A1* | 9/2010 | Al-Shameri et al. | 707/769 |
| 2010/0278420 A1* | 11/2010 | Shet et al. | 382/156 |
| 2011/0066618 A1* | 3/2011 | Sigurbjornsson et al. | 707/739 |
| 2011/0072012 A1* | 3/2011 | Ah-Pine et al. | 707/725 |
| 2011/0106656 A1* | 5/2011 | Schieffelin | 705/26.9 |
| 2011/0135166 A1* | 6/2011 | Wechsler et al. | 382/118 |
| 2011/0196859 A1* | 8/2011 | Mei et al. | 707/723 |
| 2011/0268364 A1* | 11/2011 | Hido | 382/218 |
| 2011/0320454 A1* | 12/2011 | Hill et al. | 707/739 |
| 2012/0221572 A1* | 8/2012 | Wang et al. | 707/737 |
| 2012/0254076 A1* | 10/2012 | Yang et al. | 706/12 |

OTHER PUBLICATIONS

Michihiro Kobayakawa, Shigenao Kinjo, Mamoru Hoshi, Tadashi Ohmori, Atsushi Yamamoto, "Fast Computation of Similarity Based on Jaccard Coefficient for Composition-Based Image Retrieval", http://link.springer.com/chapter/10.1007%2F978-3-642-10467-1_87, Dec. 15, 2009.*

(Continued)

*Primary Examiner* — Robert Beausoliel, Jr.
*Assistant Examiner* — Nicholas Allen
(74) *Attorney, Agent, or Firm* — Joseph Kolodka

(57) ABSTRACT

Systems and methods for image retrieval include constructing a plurality of graphs including a first graph for candidate images retrieved based upon holistic features of a query image and a second graph for candidate images retrieved based upon local features of the query image, wherein constructing includes weighting connected images based upon a Jaccard similarity coefficient. The plurality of graphs are fused to provide a fused graph. Candidate images of the fused graph are ranked, using a processor, to provide retrieval results of the query image.

11 Claims, 4 Drawing Sheets

(56) References Cited

OTHER PUBLICATIONS

Andoni, A., et al. "Near-Optimal Hashing Algorithms for Approximate Nearest Neighbor in High Dimensions" Communications of the ACM, vol. 51, No. 1. Jan. 2008. pp. 117-122.
Berkin, P., et al. "A Survey on Pagerank Computing" Internet Mathematics, vol. 2, No. 1. 2005. pp. 73-120.
Chen, D., et al. "City-Scale Landmark Identification on Mobile Devices" The 24th IEEE Conference on Computer Vision and Pattern Recognition. Jun. 2011. pp. 737-744.
Chum, O., et al. "Total Recall: Automatic Query Expansion With a Generative Feature Model for Object Retrieval" IEEE 11th International Conference on Computer Vision. Oct. 2007. pp. 1-8.
Fagin, R., et al. "Efficient Similarity Search and Classification Via Rank Aggregation" Proceedings of the 2003 ACM SIGMOD International Conference on Management of Data. Jun. 2003. (12 Pages).
Gehler, P., et al. "On Feature Combination for Multiclass Object Classification" IEEE 12th International Conference on Computer Vision. Oct. 2009. (8 Pages).
Gong, Y., et al. "Iterative Quantization: A Procrustean Approach to Learning Binary Codes" The 24th IEEE Conference on Computer Vision and Pattern Recognition. Jun. 2011. pp. 817-824.
Jegou, H., et al. "Hamming Embedding and Weak Geometric Consistency for Large Scale Image Search" 10th European Conference on Computer Vision. Oct. 2008. pp. 1-15.
Jegou, H., et al. "Accurate Image Search Using the Contextual Dissimilarity Measure" IEEE Transactions on Pattern Analysis and Machine Intelligence (TPAMI). vol. 32, No. 1. Jan. 2010. pp. 1-23.
Jegou, H., et al. "Aggregating Local Descriptors Into a Compact Image Representation" The Twenty-Third IEEE Conference on Computer Vision and Pattern Recognition, CVPR 2010. Jun. 2010. (8 Pages).
Jing, Y., et al. "Visualrank: Applying Pagerank to Large-Scale Image Search" IEEE Transactions on Pattern Analysis and Machine Intelligence, vol. 30, No. 11. Nov. 2008. pp. 1877-1890.
Lowe, D. "Distinctive Image Features From Scale-Invariant Keypoints" International Journal of Computer Vision, vol. 60, No. 2. Nov. 2004. pp. 1-28.
Nister, D., et al. "Scalable Recognition With a Vocabulary Tree" 2006 IEEE Computer Society Conference on Computer Vision and Pattern Recognition (CVPR 2006). Jun. 2006. (8 Pages).
Oliva, A., et al. "Modeling the Shape of the Scene: A Holistic Representation of the Spatial Envelope" International Journal of Computer Vision, vol. 42, No. 3. Jun. 2001. pp. 145-175.
Page, L., et al. "The Pagerank Citation Ranking: Bringing Order to the Web" Proceedings of the 7th International World Wide Web Conference. Jan. 1998. pp. 1-17.
Philbin, J., et al. "Object Retrieval With Large Vocabularies and Fast Spatial Matching" 2007 IEEE Computer Society Conference on Computer Vision and Pattern Recognition (CVPR 2007). Jun. 2007. (8 Pages).
Qin, D., et al. "Hello Neighbor: Accurate Object Retrieval With K-Reciprocal Nearest Neighbors" The 24th IEEE Conference on Computer Vision and Pattern Recognition, CVPR 2011. Jun. 2011. pp. 777-784.
Sivic, J., et al. "Video Google: A Text Retrieval Approach to Object Matching in Videos" 9th IEEE International Conference on Computer Vision (ICCV 2003). Oct. 2003. pp. 1-8.
Torralba, A., et al. "Small Codes and Large Image Databases for Recognition" 2008 IEEE Computer Society Conference on Computer Vision and Pattern Recognition (CVPR 2008). Jun. 2008. pp. 1-9.
Vedaldi, A., et al. "VLFEAT—An Open and Portable Library of Computer Vision Algorithms" Proceedings of the 18th International Conference on Multimedia 2010. Oct. 2010. (4 Pages).
Wang, J., et al. "Semi-Supervised Hashing for Scalable Image Retrieval" Semi-Supervised Hashing for Scalable Image Retrieval. Jun. 2010. (8 Pages).
Wang, J., et al. "Sequential Projection Learning for Hashing With Compact Codes" Proceedings of the 27th International Conference on Machine Learning (ICML-10). Jun. 2010. (8 Pages).
Wang, X., et al. "Contextual Weighting for Vocabulary Tree Based Image Retrieval" IEEE International Conference on Computer Vision, ICCV 2011. Nov. 2011. (8 Pages).
Weiss, Y., et al. "Spectral Hashing" Proceedings of the Twenty-Second Annual Conference on Neural Information Processing Systems. Dec. 2008. pp. 1-8.
Wu, Z., et al. "Bundling Features for Large Scale Partial-Duplicate Web Image Search" 2009 IEEE Computer Society Conference on Computer Vision and Pattern Recognition (CVPR 2009). Jun. 2009. (8 Pages).
Zhang, Y., et al. "Image Retrieval With Geometry-Preserving Visual Phrases" The 24th IEEE Conference on Computer Vision and Pattern Recognition, CVPR 2011. Jun. 2011. pp. 809-816.
Zhou, W., et al. "Spatial Coding for Large Scale Partial-Duplicate Web Image Search" Proceedings of the 18th International Conference on Multimedia 2010. Oct. 2010. (10 Pages).

\* cited by examiner

QUERY SPECIFIC FUSION FOR IMAGE RETRIEVAL

RELATED APPLICATION INFORMATION

This application claims priority to provisional application Ser. No. 61/561,996 filed on Nov. 21, 2011, incorporated herein by reference in its entirety.

BACKGROUND

1. Technical Field

The present invention relates to image retrieval, and more specifically to query specific fusion for image retrieval.

2. Description of the Related Art

Conventional image retrieval queries using visual features use either local features indexed by a vocabulary tree or holistic features indexed by compact hashing codes. Vocabulary tree based methods are effective in identifying near-duplicate images or regions, since local features are particularly capable of attending to local image patterns or textures. However, similar textures may distract these vocabulary tree based methods to present some candidates appearing irrelevant to a query. Holistic features such as color histograms delineate overall feature distributions in images. Thus, retrieved candidates based on holistic features may often appear similar at a glance, but may not actually be of interest.

SUMMARY

A method for image retrieval includes constructing a plurality of graphs including a first graph for candidate images retrieved based upon holistic features of a query image and a second graph for candidate images retrieved based upon local features of the query image, wherein constructing includes weighting connected images based upon a Jaccard similarity coefficient. The plurality of graphs are fused to provide a fused graph. Candidate images of the fused graph are ranked, using a processor, to provide retrieval results of the query image.

A method for image retrieval includes constructing a plurality of graphs including a first graph for candidate images retrieved based upon holistic features of a query image and a second graph for candidate images retrieved based upon local features of the query image, wherein constructing includes weighting connected images based upon a Jaccard similarity coefficient. The plurality of graphs are fused to provide a fused graph. Candidate images of the fused graph are ranked, using a processor, to provide retrieval results of the query image by determining a maximum weighted subgraph, the subgraph being iteratively expanded by adding an image connected to the subgraph with a greatest weight to the subgraph.

A system for image retrieval includes a graph construction module configured to construct a plurality of graphs including a first graph for candidate images retrieved based upon holistic features of a query image and a second graph for candidate images retrieved based upon local features of the query image, the graph construction module further configured to weight connected images based upon a Jaccard similarity coefficient. A graph fusion module is configured to fuse the plurality of graphs to provide a fused graph. A link analysis module is configured to rank, using a processor, candidate images of the fused graph to provide retrieval results of the query image.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
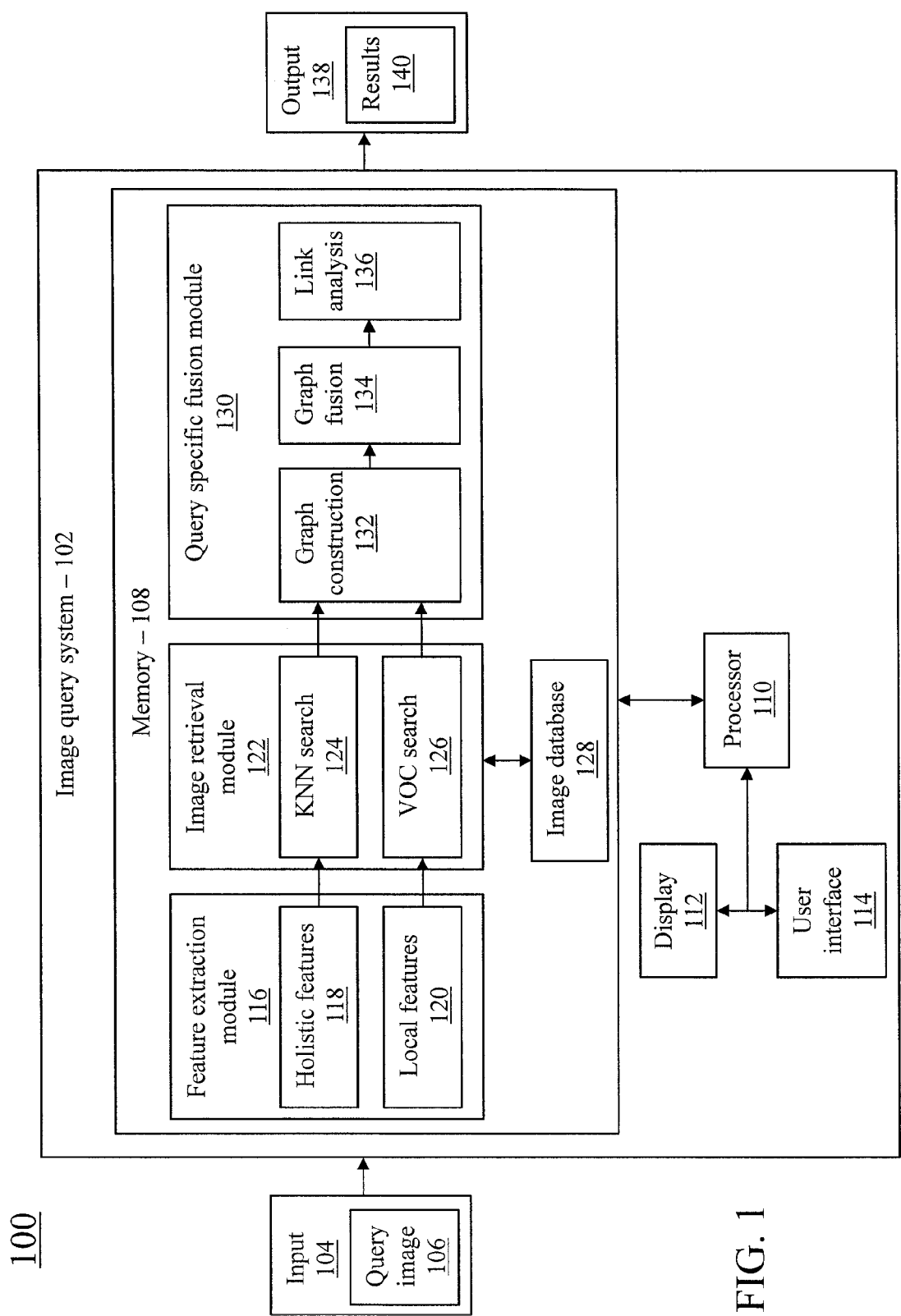
FIG. 1 shows a block/flow diagram of a system/method for query specific fusion for image retrieval in accordance with one illustrative embodiment.

In accordance with the present principles, systems and methods of query specific fusion for image retrieval are discussed. For a query image, holistic features (e.g., color histogram) and local features are extracted. Based on the feature extraction, image retrieval is performed to retrieve candidate images from an image database. Preferably, image retrieval is performed for both holistic features and local features. Image retrieval based upon holistic features may be performed by a, e.g., k-nearest neighbor (KNN) search. Image retrieval based upon local features may be performed by, e.g., a vocabulary tree search.

Graphs are constructed for the images retrieved based upon holistic features and for the images retrieved based upon local features. Images (i.e., query image and candidate images) are represented as nodes in the graph. Edges connect nodes determined by the reciprocal nearest neighbor relation. Preferably, edges are weighted based upon the Jaccard similarity coefficient.

The graph for images retrieved based upon holistic features and the graph for images retrieved based upon local features are fused by consolidating the nodes. Edge weights in the fused graph are determined as the sum of the corresponding weights in the individual graphs. The candidate images of the fused graph are then reranked to provide image retrieval results.

In one embodiment, reranking includes determining a maximum weighted density subgraph centered at the query image. Initially, the subgraph only includes the query image node. The subgraph is expanded by iteratively adding to the subgraph the node with the largest weight that is connected to the subgraph. Node weights are computed for each node by accumulating the weights of its connected edges. This procedure is iteratively applied until there are a sufficient number of image candidates. The nodes are ranked according to the order that they are added to the subgraph.

In another embodiment, reranking is performed by a localized PageRank™ on the edges. Nodes are ranked according to their probability. A high probability reflects a higher relevance to the query.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a block/flow diagram showing a system 100 for query specific fusion for image retrieval is illustratively depicted in accordance with one illustrative embodiment. The image query system 102 preferably includes one or more processors 110 and memory 108 for storing programs, applications and other data. It should be understood that the functions and components of system 102 may be integrated into one or more systems.

System 102 may include a display 112 for viewing (e.g., images). The display 112 may also permit a user to interact with them system 102 and its components and functions. This is further facilitated by a user interface 114, which may include a keyboard, mouse, joystick or any other peripheral or control to permit user interaction with the system 102.

System 102 receives input 104, which preferably includes one or more query images 106, which may be stored in memory 108. Memory 108 includes feature extraction module 116 to extract features of the query image 106, including both holistic features 118 and local invariant features 120. Holistic features, such as, e.g., color histograms and GIST, are preferably indexed by locality-sensitive hashing (LSH), resulting in highly compact binary codes (e.g., 128 bits) which can be efficiently compared with a large database using, e.g., the Hamming distance. Local features 120, such as, e.g., scale-invariant feature transform (SIFT) and speeded up robust feature (SURF) descriptors, are preferably indexed using a vocabulary tree. Other types of feature extraction are also contemplated.

Memory 108 also includes image retrieval module 122 configured to perform image retrieval using image database 128. Image retrieval module 122 first retrieves image candidates based on holistic features 118 by performing, e.g., a k-nearest neighbor (KNN) search, where k is any positive integer. Preferably, k is an input to the system 102 and is proportional to the expected number of relevant images in the image database 128. Scalability and performance may be improved by spectral graph partitioning in spectral hashing and incorporating the pairwise semantic similarity and dissimilarity constraints from labeled data in the semi-supervised hashing. A random rotation optimized by iterative quantization may be applied to the principal component analysis (PCA) projected features to further improve performance. Other configurations of image retrieval module 122 to perform image retrieval using holistic features 118 are also contemplated.

Image retrieval module 122 also retrieves image candidates based on local features 120 using, e.g., a vocabulary tree search. Performance may be improved by a spatial verification by random sample consensus (RANSAC), query expansion, hamming embedding and imposing weak geometry constraints, construing high-order features, and indexing relative spatial positions or quantized spatial offsets among local features. Other configurations of image retrieval module 122 to perform image retrieval using local features 120 are also contemplated.

Memory 108 includes query specific fusion module 130 to combine the results of the holistic feature based image retrieval and the local feature based image retrieval. To fuse ranked retrieval results provided by different methods (e.g., holistic feature based and local feature based image retrieval), one issue is how to automatically measure and compare their quality, since no supervision and user relevance feedback is available online. As similarity scores may vary largely among queries and are not comparable between different methods, one approach is to measure the consistency among the top candidates returned by one retrieval method as the retrieval quality specific to one query. Thus, graph construction module 132 is configured to construct a plurality of weighted graphs including a first graph using retrieval results based upon holistic features and a second graph using retrieval results based upon the local features.

To perform graph construction, a query image 106 is denoted by q and the images in the image database 128 D is denoted by d∈D. For a query, the retrieval result (i.e., a ranked candidate image list) of one method is represented by $\{(i, s_i)\}$, where i is the rank and $s_i$ is the similarity score of a candidate image. Thus, the image neighborhood of an image d may be defined by $N_k(d)$ or $N_\epsilon(d)$, where $N_k(d)$ includes the images that are the top-k retrieved candidates using d as the query and $N_\epsilon(d)$ includes those $s_i > \epsilon$. Therefore, the reciprocal neighbor relation for q and d is denoted as:

$$R_{(k1,k2)}(q,d) = (q \in N_{k2}(d) \wedge d \in N_{k1}(q)) \qquad (1)$$

Being the reciprocal neighbor is a reliable indication that two images are visually similar with respect to the image representation in one retrieval method. Two different measurements $k_1$ and $k_2$ are employed for the images q and d, instead of selecting one value k, to determine reciprocal neighbors. The rationale is that for the database image d, a smaller $k_2 < k_1$ shall enforce a more strict requirement on its nearest neighbors than those of q which is the objective to the retrieval. Thus, the asymmetric setting is more flexible in defining the reciprocal neighborhood sets.

For each set of retrieval results (i.e., based on holistic features and local features), a weighted graph G=(V,E) is constructed centered at q, the query image 106. The query image and candidate images (q and d∈D) are represented as nodes. Two images that are linked by an edge are the reciprocal neighbors of each other. The weight of an edge is defined as the Jaccard similarity coefficient of the two neighborhood sets of two images. If image q and d are reciprocal neighbors, the weight w of this edge is provided as:

$$w(q, d) = \alpha \frac{|N_k(q) \cap N_k(d)|}{|N_k(q) \cup N_k(d)|} \quad (2)$$

where α is a decay coefficient related to the number of hops to the query. Edge weights range from 0 to 1. An edge weight of w(q,d)=1 means that the two images q and d share the same neighborhood sets and it is therefore assumed that the two images are highly likely to be visually similar and shall be retrieved.

The query q's reciprocal neighbors construct the first layer of the graph. The reciprocal neighbors of the nodes of the first layer of the graph (i.e., the reciprocal neighbors of q) construct the second layer with respect to q, and so on. The graph construction stops when: 1) a given maximal graph degree |G| (i.e., the maximal number of results the retrieval task requires); 2) no more reciprocal neighbors can be found; or 3) the weights of edges become smaller than a threshold as the decay coefficient α down-weights the images with multiple hops to the query. It is noted that for holistic feature based image retrieval, the similarity score and the neighborhood $N'_\epsilon(i)$ can be employed in place of $N'_k(i)$ to define the reciprocal neighbor relation and Jaccard similarity coefficient.

Figure 2:
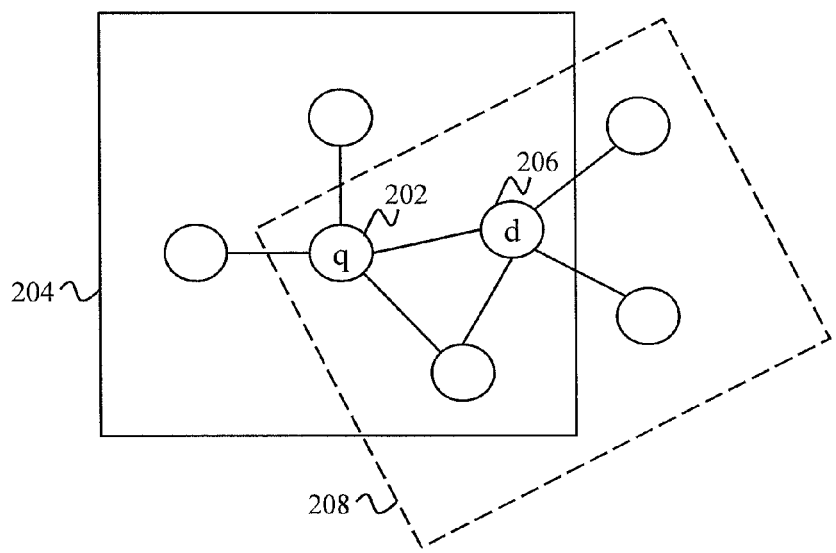
FIG. 2 shows an example of graph construction in accordance with one illustrative embodiment.

Referring for a moment to FIG. 2, an example of graph construction 200 is illustratively depicted in accordance with one embodiment. Node 202 is the query image 106 with edge links connecting the node 202 to its reciprocal nearest neighbors, which are located within box 204. Node 206 is a candidate image d at the first layer of node 202, with its reciprocal nearest neighbors in box 208. The Jaccard coefficient between images q and d is 3/7, which is the number of nodes in the intersection of boxes 204 and 208 divided by the number of nodes in the union of the boxes 204 and 208. The radius of a node indicates the influence of the decay coefficient α.

Referring back to FIG. 1, query specific fusion module 130 includes graph fusion module 134 configured to fuse the plurality of graphs constructed in graph construction module 132, including graphs constructed from holistic feature based image retrieval and local feature based image retrieval. Graph of other types of retrieval systems may also be fused by graph fusion module 134. Graph fusion module 134 fuses the individual graphs into a fused graph $\tilde{G}$ by consolidating their nodes. In the individual graphs, the weight of an edge is based on the Jaccard similarity between two nearest neighborhoods. In graph fusion, the edge weights in the fused graph $\tilde{G}$ are the sum of the corresponding weights in the individual graphs. Although the rank lists and the similarity scores in the different methods of image retrieval are not directly comparable, their Jaccard coefficients are comparable as they reflect the degree of consistency of two nearest neighborhoods. This graph fusion formulation can not only fuse multiple sets of rank lists, but also rank a single set of retrieval results.

Figure 3:
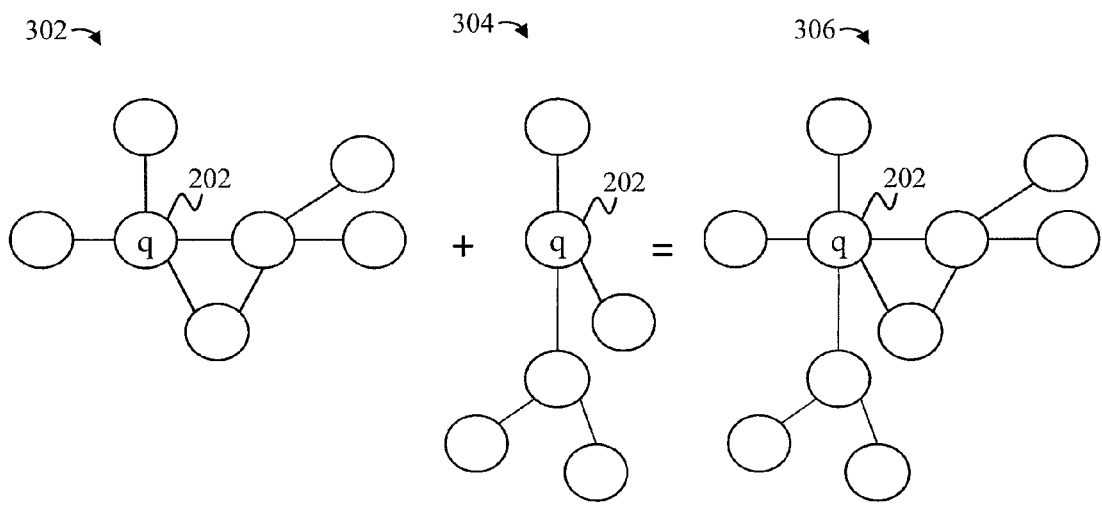
FIG. 3 shows an example of graph fusion in accordance with one illustrative embodiment.

Referring for a moment to FIG. 3, an example of graph fusions 300 is illustratively depicted in accordance with one embodiment. Graph 302 is constructed using a first method (e.g., holistic feature based image retrieval) and graph 304 is constructed using a second method (e.g., local feature based image retrieval). Graphs 302 and 304 are fused into a single graph 306 by consolidating nodes (e.g., query node 202).

Referring again to FIG. 1, query specific fusion module 130 include link analysis module 136 configured to rerank candidate images. In one embodiment, link analysis module 136 is configured to rerank candidate images by determining a maximum weighted density subgraph in the fused graph $\tilde{G}$. As the visual similarity of two images from different image representations has been encoded in the edge weights in $\tilde{G}$, the subgraph $G' \subset \tilde{G}$ and $q \in G'$ is searched such that the weighted density of this subgraph is maximized as follows:

$$\text{argmax}_{G'} \frac{|\Sigma w(e \in G')|}{|V(G')|}$$

where e is the edge belonging to the subgraph G', and |V(G')| is the number of nodes in the subgraph G'. In other words, nodes which can contribute more weight to the subgraph G' are selected to be added to G'. Since weights are correlated with the retrieval quality, this approach selects images with potentially higher visual similarity.

In general, Equation (3) is an NP-hard program, so it is solved efficiently by greedy enlarging the subgraph G' starting from the query image q. Initially, the subgraph G' only includes the query node q. All nodes that are connected to the current subgraph G' are then considered and the one node which can introduce the largest weight to the subgraph G' is selected to be added to G'. Node weights for each node are computed by accumulating the weights of its connected edges. Ties in node weights may be broken arbitrarily, however other methods of tie-breaking are also contemplated. Subgraph G' is iteratively expanded until there are a sufficient number of image retrievals. The sufficient number of image retrievals is preferably based on the application.

Figure 4:
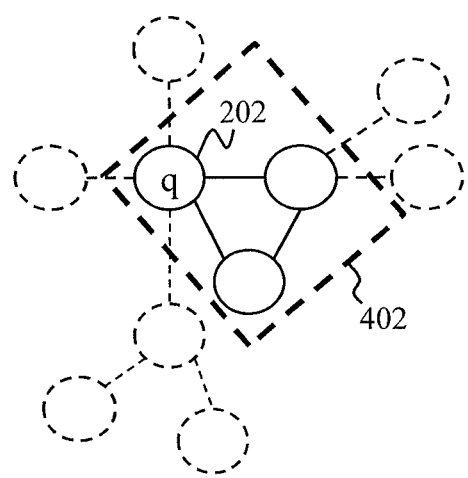
FIG. 4 shows an example of determining candidate nodes of the subgraph in accordance with one illustrative embodiment.

Referring for a moment to FIG. 4, an example of determining candidate nodes of the subgraph G' 400 is illustratively depicted in accordance with one embodiment. Box 402 represents G'. Candidate nodes are connected to G' and denoted by dashed lines.

Advantageously, ranking by maximizing weighted density is very efficient. The computational complexity mainly depends on the connectivity (i.e., the average valence of all nodes) but not the number of nodes in $\tilde{G}$, since only the nodes connecting to the current subgraph G' are checked. Thus, this method generates ranking results within similar time, even for different sizes of $\tilde{G}$.

Referring back to FIG. 1, in another embodiment, link analysis module 136 is configured to rerank candidate images by localized PageRank™. Instead of using the greedy method to select high weighted nodes that implicitly captures the notion of well-connected images, a principled link analysis is performed on the fused graph $\tilde{G}$ to rank according to node connectivity. The fused graph $\tilde{G}$ is treated as a network. Since this network is built by considering the retrieval relevance, naturally a node is more important or relevant if it has a higher probability to be visited.

Denote L as an n×n weighted adjacency matrix, where $n = |\tilde{G}|$ is the number of nodes in the fused graph. An element $L_{ij}$ is equal to $w(e_{ij})$ if a node i links to j by an edge i→j. The out-degree of a node i is the summation of its outgoing edges, $\text{deg}(i) = \Sigma_j L_{ij}$. A transition matrix P is defined as $P_{ij} = L_{ij}/\text{deg}(i)$. Thus, for such i, it is row-stochastic (i.e., each row sums to one).

Consider the assumption of random surfer model. A surfer moves along the directed graph (in this case, each undirected edge is considered as two directed edges: in and out). If at a step k it is at a node i, then at the next step k+1 it moves at random to any neighbor j of i. Denote $p^{(k)} = (p_i^{(k)})$ as a distribution of probabilities to be at a node i at a step k. The goal is to find the equilibrium state of p, where higher probability reflects a higher relevance to the query. The solution is the PageRank™ vector as a stationary point of using the power method:

$$p^{(k+1)}=Ap^{(k)}, A=P^T. \qquad (4)$$

The sum of the p-components is assumed to be one. The initial value of p is flexible, since the result is determined by the transition matrix. p is initialized with $p(i_q)=1$ where $i_q$ is the index of the query node. Once the stationary point is reached, these nodes or images are ranked as per their probabilities. The computation of this localized PageRank™ method is determined by $n=|\tilde{G}|$.

Results 140 of the link analysis module 136 are outputted in output 138. Advantageously, the image query system 102 yields higher retrieval precision and better user experience, since the fusion favors candidate images similar to the query in terms of different image representations. The query specific fusion is efficient compared to other re-ranking methods (e.g., fitting a geometric transform). The query specific fusion can cope well with some singular cases, such as overlap of top candidates from individual cues.

Figure 5:
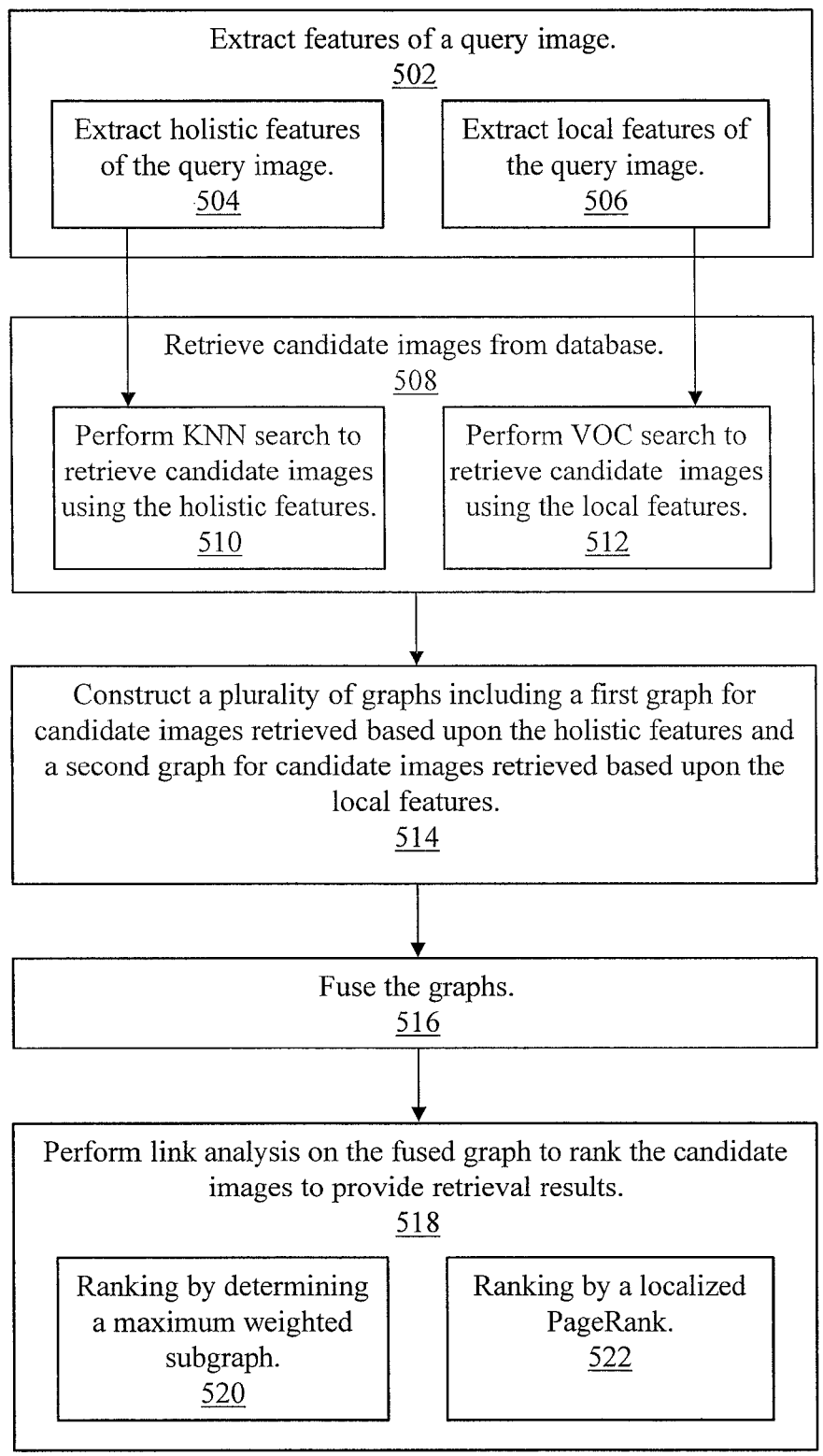
FIG. 5 shows a block/flow diagram of a system/method for query specific fusion for image retrieval in accordance with one illustrative embodiment.

Referring now to FIG. 5, a block/flow diagram showing a method for query specific fusion for image retrieval in accordance with one illustrative embodiment. In block 502, features of a query image are extracted. In block 504, holistic features of the query image are extracted. Holistic features (e.g., color histograms) are preferably indexed by LSH. In block 506, local features of the query image are extracted. Local features are preferably indexed using a vocabulary tree. Other types of feature extraction are also contemplated.

In block 508, images are retrieved from an image database. In block 510, a KNN search is performed to retrieve images based on the holistic features. In block 512, a vocabulary tree search is performed to retrieve images based on the local features. Other retrieval methods are also contemplated.

In block 514, a plurality of graphs are constructed including a first graph based upon images retrieved using the holistic features of the query image and a second graph based upon images retrieved using the local features of the query image. Graphs may also be constructed based on other retrieval methods. The plurality of graphs is preferably weighted nondirected graphs. Nodes of the graphs are represented as the images (i.e., the query image and candidate images). Nodes that are, e.g., reciprocal nearest neighbors are connected by edge links. Edges are weighted based on the Jaccard similarity coefficient of two k-reciprocal neighborhoods. The weight may factor in a decay coefficient related to the number of hops to the query image.

In block 516, the graphs are fused. Preferably, graphs are fused by consolidating the nodes. The weights for each node of the fused graph are provided by combining the weights of the corresponding nodes in the individual graphs. It is noted that graph fusion may include fusing multiple graphs constructed from multiple retrieval methods.

In block 518, link analysis is performed on the fused graph to rerank the retrieved results to provide retrieval results. In one embodiment, in block 520, reranking is performed by searching for the maximum weighted density subgraph of the fused graph. The maximum density subgraph initially includes only the query node. The maximum density subgraph is iteratively expanded by considering all nodes connected to the subgraph and selecting the node with the largest weight as part of the subgraph. Node weights for each node are computed by accumulating the weights of its connected edges. Nodes with the same weight may be chosen arbitrarily; however other methods are also contemplated. The maximum density subgraph is iteratively expanded until there are a sufficient number of image retrievals. The nodes are ranked according to the order that they are added to the subgraph.

In another embodiment, in block 522, reranking is performed by a localized PageRank. Consider the assumptions of the random surfer model, where a surfer moves along the directed fused graph at random until an equilibrium state of the distribution of probabilities is reached. Nodes are ranked according to their probability, where a higher probability reflects a higher query relevance.

Having described preferred embodiments of a system and method for query specific fusion for image retrieval (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for image retrieval, comprising:
capturing images from a camera sensor or from a computer generated display memory;
constructing a plurality of graphs including a first graph for candidate images retrieved based upon holistic features of a query image and a second graph for candidate images retrieved based upon local features of the query image, wherein constructing includes weighting connected images based upon a Jaccard similarity coefficient determined as:

$$w(q, d) = \alpha \frac{|N_k(q) \cap N_k(d)|}{|N_k(q) \cup N_k(d)|}$$

where w is weight of an edge for images q and d that are reciprocal neighbors, N represents a neighborhood, and α is a decay coefficient related to number of hops to the query;
fusing the plurality of graphs to provide a fused graph; and
ranking, using a processor, candidate images of the fused graph to provide retrieval results of the query image.

2. The method as recited in claim 1, wherein fusing includes combining weights of the connected images from each of the plurality of graphs.

3. The method as recited in claim 1, wherein ranking includes determining a maximum weighted subgraph.

4. The method as recited in claim 3, wherein ranking includes iteratively expanding the maximum weighted subgraph by adding an image to the subgraph with a greatest weight that is connected to the subgraph.

5. The method as recited in claim 4, wherein ranking includes ranking images according to an order they were added to the subgraph.

6. A method for image retrieval, comprising:
capturing images from a camera sensor or from a computer generated display memory;
constructing a plurality of graphs including a first graph for candidate images retrieved based upon holistic features of a query image and a second graph for candidate images retrieved based upon local features of the query image, wherein constructing includes weighting connected images based upon a Jaccard similarity coefficient determined as:

$$w(q, d) = \alpha \frac{|N_k(q) \cap N_k(d)|}{|N_k(q) \cup N_k(d)|}$$

where w is weight of an edge for images q and d that are reciprocal neighbors, N represents a neighborhood, and $\alpha$ is a decay coefficient related to number of hops to the query;

fusing the plurality of graphs to provide a fused graph; and ranking, using a processor, candidate images of the fused graph to provide retrieval results of the query image by determining a maximum weighted subgraph, the subgraph being iteratively expanded by adding an image to the subgraph with a greatest weight that is connected to the subgraph.

7. A system for image retrieval, comprising:

a processor;

a graph construction module configured to construct a plurality of graphs including a first graph for candidate images retrieved based upon holistic features of a query image and a second graph for candidate images retrieved based upon local features of the query image, the graph construction module further configured to weight connected images based upon a Jaccard similarity coefficient determined as:

$$w(q, d) = \alpha \frac{|N_k(q) \cap N_k(d)|}{|N_k(q) \cup N_k(d)|}$$

where w is weight of an edge for images q and d that are reciprocal neighbors, N represents a neighborhood, and a is a decay coefficient related to number of hops to the query;

a graph fusion module configured to fuse the plurality of graphs to provide a fused graph; and a link analysis module configured to rank, using a processor, candidate images of the fused graph to provide retrieval results of the query image.

8. The system as recited in claim 7, wherein the graph fusion module is further configured to combine weights of the connected images from each of the plurality of graphs.

9. The system as recited in claim 7, wherein the link analysis module is further configured to determine a maximum weighted subgraph.

10. The system as recited in claim 9, wherein the link analysis module is further configured to iteratively expand the maximum weighted subgraph by adding an image to the subgraph with a greatest weight that is connected to the subgraph.

11. The system as recited in claim 10, wherein the link analysis module is further configured to rank images according to an order they were added to the subgraph.

* * * * *